(12) United States Patent
Olarig

(10) Patent No.: US 7,096,407 B2
(45) Date of Patent: Aug. 22, 2006

(54) TECHNIQUE FOR IMPLEMENTING CHIPKILL IN A MEMORY SYSTEM

(75) Inventor: Sompong P. Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 494 days.

(21) Appl. No.: 10/369,051

(22) Filed: Feb. 18, 2003

(65) Prior Publication Data

US 2004/0163028 A1 Aug. 19, 2004

(51) Int. Cl.
*G11C 29/00* (2006.01)

(52) U.S. Cl. .................................... 714/768
(58) Field of Classification Search ............... 714/764, 714/770; 361/737, 748
See application file for complete search history.

(56) References Cited

U.S. PATENT DOCUMENTS

| | | | | |
|---|---|---|---|---|
| 5,754,562 A | * | 5/1998 | Chen | 714/752 |
| 5,790,447 A | * | 8/1998 | Laudon et al. | 365/52 |
| 6,009,548 A | * | 12/1999 | Chen et al. | 714/762 |
| 6,111,757 A | * | 8/2000 | Dell et al. | 361/737 |
| 6,161,165 A | * | 12/2000 | Solomon et al. | 711/114 |
| 6,587,640 B1 | * | 7/2003 | Yoneya et al. | 386/96 |
| 6,751,769 B1 | * | 6/2004 | Chen et al. | 714/767 |
| 6,785,835 B1 | * | 8/2004 | MacLaren et al. | 714/6 |
| 2002/0152444 A1 | * | 10/2002 | Chen et al. | 714/785 |

OTHER PUBLICATIONS

Timothy J. Dell, A white Paper on the Benefits of Chipkill-Correct ECC for PC Server main Memory.□□IBM Microelectronics Division—Rev Nov. 19, 1997.*
David Locklear, Chipkill Correct Memory Architecture.□□Dell Enterprise Sysyems Group. Aug. 2000.*

* cited by examiner

*Primary Examiner*—Guy Lamarre
*Assistant Examiner*—Sam Rizk

(57) ABSTRACT

A technique for handling errors in a memory system. Specifically, a new dual mode ECC algorithm is provided to detect errors in memory devices. Further, an XOR memory engine is provided to correct the errors detected in the dual mode ECC algorithm. Depending on the mode of operation of the dual mode ECC algorithm and the error type (single-bit or multi-bit), errors may be corrected using ECC techniques. If X16 or X32 memory devices are implemented, a technique for striping the data from each memory device is implemented to detect errors in the X16 and X32 devices.

15 Claims, 5 Drawing Sheets

TECHNIQUE FOR IMPLEMENTING CHIPKILL IN A MEMORY SYSTEM

CROSS-REFERENCE TO RELATED APPLICATIONS

The following commonly owned application is hereby incorporated by reference for all purposes:

U.S. patent application Ser. No. 10/368549, filed concurrently herewith, entitled "Technique for Implementing Chipkill in a Memory System With X8 Memory Devices" by John M. MacLaren and Sompong P. Olarig.

BACKGROUND OF THE INVENTION

1. Field of the Invention

This invention relates generally to computer systems and, more particularly, to error handling in a memory system.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer systems, such as the personal computers and servers, rely on microprocessors, associated chip sets, and memory chips to perform most of their processing functions. In contrast to the dramatic improvements of the processing portions of a computer system, the mass storage portion of a computer system has experienced only modest growth in speed and reliability. As a result, computer systems fail to capitalize fully on the increased speed of the improving processing systems due to the dramatically inferior capabilities of the mass data storage devices coupled to the systems.

While the speed of these mass storage devices, such as magnetic disk drives, has not improved much in recent years, the size of such disk drives has become smaller while maintaining the same or greater storage capacity. Furthermore, such disk drives have become less expensive. To capitalize on these benefits, it was recognized that a high capacity data storage system could be realized by organizing multiple small disk drives into an array of drives. However, it was further recognized that large numbers of smaller disk drives dramatically increased the chance of a disk drive failure which, in turn, increases the risk of data loss. Accordingly, this problem has been addressed by including redundancy in the disk drive arrays so that data lost on any failed disk drive can be reconstructed through the redundant information stored on the other disk drives. This technology has been commonly referred to as "redundant arrays of inexpensive disks" (RAID).

To date, at least five different levels of RAID have been introduced. The first RAID level ("RAID Level 1") utilizes mirrored devices. In other words, data is written identically to at least two disks. Thus, if one disk fails, the data can be retrieved from one of the other disks. Of course, a RAID Level 1 system requires the cost of an additional disk without increasing overall memory capacity in exchange for decreased likelihood of data loss. The second level of RAID ("RAID Level 2") implements an error code correction or "ECC" (also called "error check and correct") scheme where additional check disks are provided to detect single errors, identify the failed disk, and correct the disk with the error. The third level RAID system ("RAID Level 3") stripes data at a byte-level across several drives and stores parity data in one drive. RAID Level 3 systems generally use hardware support to efficiently facilitate the byte-level striping. The fourth level of RAID ("RAID Level 4") stripes data at a block-level across several drives, with parity stored on one drive. The parity information allows recovery from the failure of any single drive. The performance of a RAID Level 4 array is good for read requests. Writes, however, may require that parity data be updated each time. This slows small random writes, in particular, though large writes or sequential writes may be comparably faster. Because only one drive in the array stores redundant data, the cost per megabyte of a RAID Level 4 system may be fairly low. Finally, a level 5 RAID system ("RAID Level 5") provides block-level memory striping where data and parity information are distributed in some form throughout the disk drives in the array. Advantageously, RAID Level 5 systems may increase the processing speed of small write requests in a multi-processor system since the parity disk does not become a system bottleneck.

The implementation of data redundancy, such as in the RAID schemes discussed above, provides fault tolerant computer systems wherein the system may still operate without data loss, even if one drive fails. This is contrasted to a disk drive array in a non-fault tolerant system where the entire system is considered to have failed if any one of the drives fails. Of course, it should be appreciated that each RAID scheme necessarily trades some overall storage capacity and additional expense in favor of fault tolerant capability. Thus, RAID systems are primarily found in computers performing mission critical functions where failures are not easily tolerated. Such functions may include, for example, a network server, a web server, a communication server, etc. One of the primary advantages of a fault tolerant mass data storage system is that it permits the system to operate even in the presence of errors that would otherwise cause the system to malfunction. As discussed previously, this is particularly important in critical systems where downtime may cause relatively major economic repercussions.

As with disk arrays, memory devices may be arranged to form memory arrays. For instance, a number of Dynamic Random Access Memory (DRAM) devices may be configured to form a single memory module, such as a Dual Inline Memory Module (DIMM). The memory chips on each DIMM are typically selected from one or more DRAM technologies, such as synchronous DRAM, double data rate SDRAM, direct-RAM bus, and synclink DRAM, for example. Typically, DIMMs are organized into an X4 (4-bit wide), an X8 (8-bit wide), or larger fashion. In other words, the memory chips on the DIMM are either 4-bits wide, 8-bits wide, 16-bits wide or 32-bits wide. To produce a 72-bit data word using an X4 memory organization, an exemplary DIMM may include nine 4-bit wide memory chips located on one side of the DIMM and nine 4-bit wide memory chips located on the opposite side of the DIMM. Conversely, to produce a 72-bit data word using an X8 memory organization, an exemplary DIMM may include nine 8-bit wide memory chips located on a single side of the DIMM. The memory modules may be arranged to form memory segments and the memory segments may be combined to form memory arrays. Controlling the access to and from the memory devices as quickly as possible while adhering to layout limitations and maintaining as much fault tolerance as possible is a challenge to system designers.

One mechanism for improving fault tolerance is to provide a mechanism such as an Error Checking and Correcting (ECC) algorithm. ECC is a data encoding and decoding scheme that uses additional data bits to provide error checking and correcting capabilities. Today's standard ECC algorithms, such as the Intel P6 algorithm, can detect single-bit or multi-bit errors within an X4 memory device. Further, typical ECC algorithms provide for single-bit error correction (SEC). However, typical ECC algorithms alone may not be able to correct multi-bit errors. Further, while typical ECC algorithms may be able to detect single bit errors in X8 devices, they cannot reliably detect multi-bit errors in X8 devices, much less correct those errors. In fact, approximately 25% of all possible multi-bit errors within an X8 memory device are either undetected or wrongly detected as single-bit errors or "misaliased." Misaliasing refers to multi-bit error conditions in an X8 (or larger) memory device that defeat standard ECC algorithms such that the multi-bit errors appear to the ECC logic to be either correct data or data with a single-bit correctable error.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
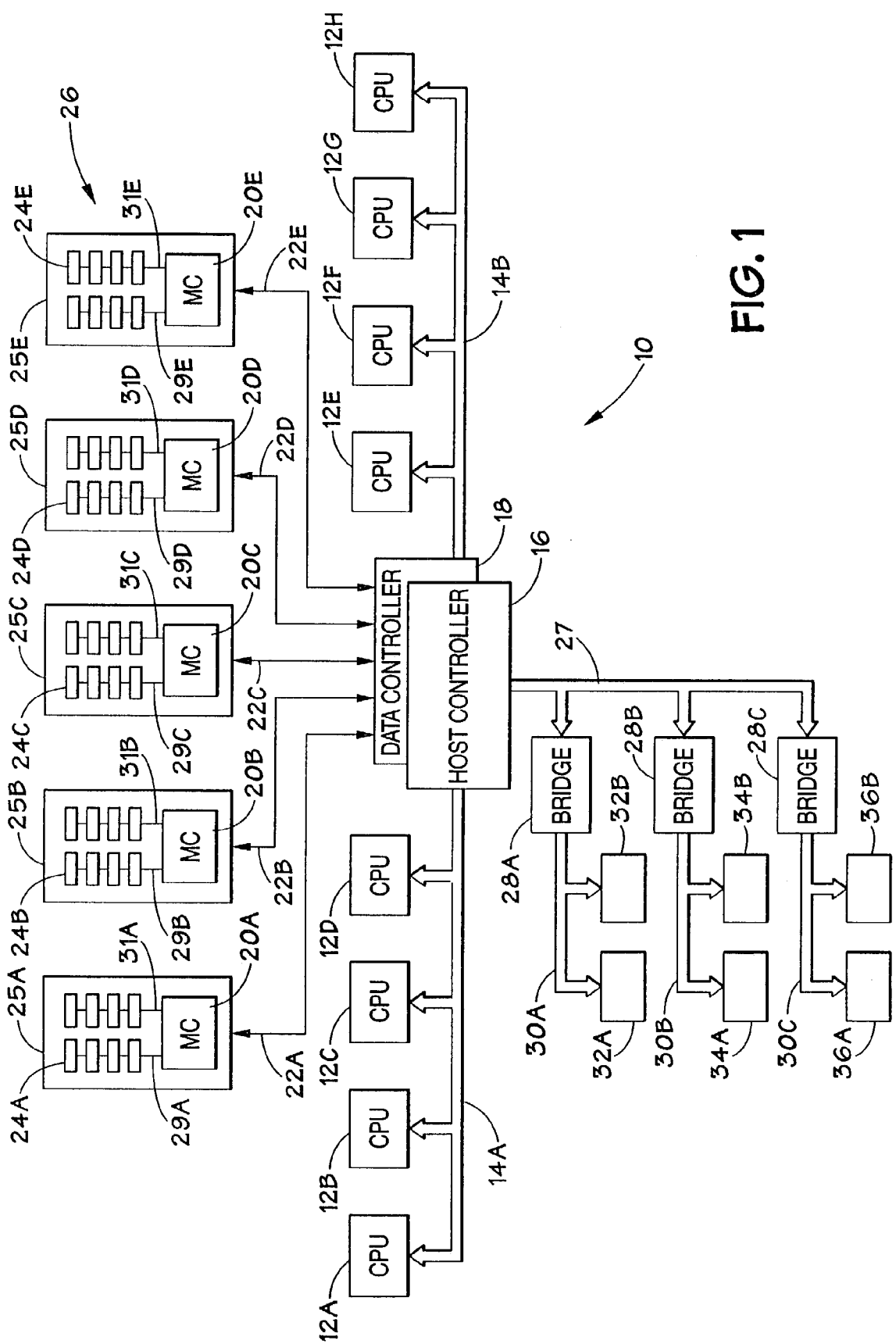
FIG. 1 is a block diagram illustrating an exemplary computer system in accordance with the present invention.

Turning now to the drawings and referring initially to FIG. 1, a block diagram of an exemplary computer system is illustrated and generally designated as reference numeral 10. The computer system 10 typically includes one or more processors or CPUs 12A–12H. In the exemplary embodiment, the system 10 utilizes eight CPUs 12A–12H. The system 10 utilizes a split bus configuration in which the processors 12A–12D are coupled to a first bus 14A, whereas the processors 12E–12H are coupled to a second bus 14B. It should be understood that the processors or CPUs 12A–12H may be of any suitable type, such as a microprocessor available from Intel, AMD, or Motorola, for example. Furthermore, any suitable bus arrangement may be coupled to the CPUs 12A–12H, such as a single bus, a split bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross bar slave device controlled by the host controller 16. Therefore, these chips will be referred to together as the host/data controller 16,18. The host/data controller 16,18 is further coupled to one or more memory controllers. In this particular example, the host/data controller 16,18 is coupled to five memory controllers 20A–20E via five individual bus segments 22A–22E, respectively. These individual bus segments 22A–22E (also referred to herein as MNET) may facilitate the removal of individual memory modules. Each of the memory controllers 20A–20E is further coupled to a segment of main memory designated as 24A–24E, respectively. As discussed in detail below, each of the memory segments or modules 24A–24E is typically comprised of dual inline memory modules (DIMMs).

As will be appreciated from the discussion herein, the number of memory segments 24 may vary depending upon the type of memory system desired. In general, redundant memory systems will utilize two or more memory segments 24. Although the five memory segments 24A–24E illustrated in the exemplary embodiment facilitate a "4+1" striping pattern of data and parity information as discussed in detail below, a memory system having two memory segments 24 may be used in which data is mirrored on each segment to provide redundancy. Similarly, a memory system having three or more memory segments may be used to provide various combinations of data and parity striping.

Each of the memory controllers 20A–20E and its associated main memory segment 24A–24E forms a portion of the main memory array 26. The five memory controllers 20A–20E operate in lock-step. In this example, each cacheline of data is striped, and each of the memory controllers 20A–20E handle a separate quad-word of each cacheline of data (assuming a 32 byte cacheline) that is being transferred to or from the host and data controllers 16 and 18. For example, the memory controller 20A handles the first quad-word of every data read and write transaction, the memory controller 20B handles the second quad-word, the memory controller 20C handles the third quad-word, and the memory controller 20D handles the fourth quad-word. Instead of receiving one of the four quad-words, the memory controller 20E handles data parity for the four quad-words handled by the memory controllers 20A–20D. Thus, as described below, the memory array 26 forms a "redundant array of inexpensive DIMMs" (RAID) memory structure. The functionality of the exemplary 4+1 striping scheme will be discussed more specifically with reference to FIGS. 2–4, below.

As will be explained in greater detail below, during a data read operation, the host/data controller 16,18 receives four quad-words of data plus parity from the five memory controllers 20A–20E, validates data integrity of each quad-word and parity using ECC codes, and, if necessary, corrects bad data using an exclusive OR (XOR) engine before forwarding the data to its destination. During a data write operation, the host/data controller 16,18 uses the XOR engine to calculate data parity and transfers the four quad-words of data and parity to the five respective memory controllers 20A–20E. In this embodiment, all data transfers between the host/data controller 16,18 and the five memory controllers 20A–20E are an entire cacheline, and partial writes are translated into read-modify-write operations.

Each memory controller 20A–20E along with its associated memory segment 24A–24E may be arranged on a removable cartridge 25A–25E. Furthermore, the five MNET bus segments 22A–22E may provide electrical isolation to each of the respective five controllers 20A–20E to facilitate hot-plug removal and/or replacement of each of the five memory cartridges 25A–25E. The RAID functionality described herein allows any one of the five memory segments 25A–25E to be removed while the system 10 continues to operate normally but at degraded performance, (i.e. in a non-redundant mode). Once the removed memory segment is reinstalled, the data is rebuilt from the other four memory segments, and the memory system resumes operation in its redundant, or fault-tolerant, mode.

In this embodiment, each of the memory segments 24A–24E may include one to eight dual inline memory modules (DIMMs). As described above, such DIMMs are generally organized with an X4 or an X8 device. As discussed below, X8 memory organization may defeat the typical ECC capability to detect a failure in a single device. Thus in current systems, the advantages of using X8 memory devices may be abandoned in favor of the X4 memory organization since current ECC algorithms may provide a more reliable memory subsystem.

The memory segments 24A–24E may be organized on a single channel or on 2N channels, where N is an integer. In this particular embodiment, each of the memory segments 24A–24E is divided into two channels—a first channel 29A–29E and a second channel 31A–31E, respectively. Since each memory segment 24A–24E in this embodiment is capable of containing up to eight DIMMs, each channel may be adapted to access up to four of the eight DIMMs. Because this embodiment include two channels, each of the memory controllers 20A–20E may essentially includes two independent memory controllers.

Returning to the exemplary system 10 illustrated in FIG. 1, the host/data controller 16,18 is typically coupled to one or more bridges 28A–28C via a suitable bus 27. The opposite side of each bridge 28A–28C is coupled to a respective bus 30A–30C, and a plurality of peripheral devices 32A and 32B, 34A and 34B, and 36A and 36B may be coupled to the respective buses 30A, 30B, and 30C. The bridges 28A–28C may be any of a variety of suitable types, such as PCI, PCI-X, EISA, AGP, etc.

As previously discussed, it may be advantageous to provide one or more mechanisms to improve fault tolerance in the memory array 26. One mechanism for improving fault tolerance is to provide ECC algorithms corresponding to one or more DIMMs which are able to recreate data for a failed device by incorporating extra storage devices which are used to store parity data (as with the presently described 4+1 parity scheme). For instance, on an X4 DIMM, sixteen of the memory devices may be used to store normal data while two of the memory devices may be used to store parity data to provide fault tolerance. The parity data can be used by the ECC algorithm to reproduce erroneous data bits.

Current ECC algorithms can detect and correct single-bit errors in X4 memory devices. Disadvantageously, current ECC algorithms cannot reliably detect multi-bit errors in X8 devices, much less correct such errors. The present RAID system, in conjunction with typical ECC algorithms, provides a mechanism for correcting multi-bit errors in X4 devices, as described below. In fact, the presently described system provides a mechanism for overcoming the complete failure of a memory device. "Chipkill" is an industry standard term referring to the ability of a memory system to withstand a complete memory device failure and continue to operate normally. Advantageously, when an error occurs, it effects only a single device. Thus, chipkill eliminates the vast majority of error conditions in a memory system. Disadvantageously, X4 chipkill may not provide sufficient fault tolerance to meet the requirements for all systems.

Memory devices are gradually transitioning from X4 to X8 devices due to larger capacities per device. However, while DIMMs incorporating X8 devices have become more common place, the ECC algorithm used in industry standard devices has remained the same. The standard ECC algorithm, such as the P6 algorithm defined by Intel, can only provide chipkill detection capabilities for X4 (or narrower) devices. For those systems that incorporate X8 capabilities, it may be advantageous to provide an ECC algorithm capable of reliably detecting multi-bit errors in X8 devices. Further, a mechanism for correcting the multi-bit errors in X8 memory devices would be advantageous. However, it may also be beneficial to provide a system whose fault tolerance is not degraded if X4 memory devices are incorporated.

The P6 ECC is an encoding scheme which can correct single data bit errors, and detect multi-bit errors, but only up to four adjacent bits within the same nibble or 4 adjacent bits. When a chipkill greater than 4 bits occurs, the P6 ECC logic may inadvertently correct the wrong data bit. In some cases, the P6 ECC cannot detect some multi-bit errors at all. Therefore, the XOR engine (described with reference to FIGS. 2–4 below) cannot determine which DIMM is failing. For example, if all data bits in the first byte (bit0–7) or multiple bits from two adjacent nibbles are corrupted, the resultant syndrome (which is used to identify errors, as described below) of the P6 ECC is sometimes "zero." This represents a "no error" condition indicating that no memory error is detected. In the case of a "no error" condition, the P6 ECC does not perform any flagging or correction functions. In other cases, the P6 ECC may wrongly interpret a MBE as an SBE and correct the wrong bit and pass along the data as good. Disadvantageously, in both of these cases, the P6 ECC logic incorrectly interprets the data and cannot pinpoint the bad DIMM. Thus, single bit error correction (SEC) ECC algorithms, such as the PA ECC algorithm, cannot maintain data integrity of an 8-bit or larger device. This may be a serious problem when a system is being used to run mission critical applications, since memory data corruption may occur without the system detecting the error.

With the implementation of wider memory devices, such as X8 memory devices, it would be desirable for fault-tolerant memory to be able to detect all possible errors in the X8 memory devices, as well as narrower memory devices, such as X4 memory devices. By implementing a new dual mode ECC parity checking algorithm or "matrix" in conjunction with the presently described RAID memory system, the present system is able to provide chipkill detection and correction capabilities for X8 memory devices. The presently described matrix is simply one exemplary embodiment of an algorithm that is capable of detecting multi-bit errors in an 8-bit (byte) segment. Numerous alternate embodiments of the matrix may be utilized in the present system, as can be appreciated by those skilled in the art.

The dual mode ECC is a dual-purpose error correcting/checking code. When operating in a X4 mode, it acts as a single bit correcting code and can detect errors in the adjacent 4 bits within the same nibble (similar to P6 ECC). When operating in X8 mode, it acts as an 8 adjacent bits within a single byte detection code (no single-bit correction is allowed). Error flag(s) can be used to identify which DIMM/device is bad. In X8 mode, the XOR engine 48 can be used to correct both single bit and multi-bit (in a byte) errors. An exemplary dual-mode ECC parity checking matrix is illustrated with reference to Table 1, in Appendix 1.

Table 1 defines eight bits that define the syndrome for the error correcting code, wherein each row of Table 1 corresponds to a syndrome bit. The eight syndrome bits are created by eight equations defined by Table 1. Each row of the table represents 72-bits that include 64 data bits and 8 ECC bits. As the 72-bits are read, the data bits are combined in a manner defined by the matrix in Appendix 1. For each row of bits, the data residing at each bit location where a logical 1 is illustrated in Table 1, the bit at that location is combined with all other bits in locations corresponding to the logical is in Table 1. The bits are combined together as logical XORs. Thus, each row of Table 1 defines an equation that is used to combine 64 data bits and 8 check bits to produce a single bit logical result. As indicated, row 1 corresponds to syndrome bit [0], row 2 corresponds to syndrome bit [1], etc. The eight syndrome bits are ordered to produce a single HEX number known as the syndrome that can be interpreted using Table 2, illustrated in Appendix 2. The eight syndrome bits are ordered from syndrome bit [7] to syndrome bit [0] to form the index used in Table 2.

An exemplary dual-mode ECC syndrome interpretation table is illustrated with reference to Appendix 2, below. All uncorrectable errors ("UNCER") will be flagged but will not be corrected by the ECC module. That is to say that the error looks like a multi-bit error and cannot be corrected by the ECC code. If no error is detected, the HEX value (i.e. the syndrome) will be "00." If a single bit error is detected, the HEX value produced by Table 1 will correspond to an error location identifying the single bit error. For example, if Table 1 produces a value of 68hex, a single bit error was detected at data bit 27 (DB27). If the ECC algorithm is operating in a X4 or normal ECC mode, the single bit error will be corrected by the ECC code. If the ECC algorithm is operating in a X8 mode, any memory error (single or multi-bit) will not be corrected by the ECC code. In fact, if the ECC algorithm is operating in a X8 mode, all syndrome codes except 00hex are considered uncorrectable errors that will not be corrected by the ECC algorithm. This is because in X8 mode some MBEs will map to SBE correctable errors (i.e. the errors are miscorrected or "misaliased") Check bits, like data bits, can be in error. If the HEX value is 01, then the bit error is the ECC code bit CB0.

Thus, the dual-mode ECC algorithm may be implemented to effectively handle errors in X8 memory devices. The present system provides a memory array with X8 chipkill by implementing the dual-mode ECC algorithm in conjunction with the RAID logic to provide a new level of memory fault tolerance. To implement X8 memory devices in the memory array 26, the single-bit error correction (SEC) in the dual mode ECC algorithm is disabled and RAID logic is used to correct both single-bit and multi-bit errors detected by the dual mode ECC algorithm. For X4 devices, the SEC in the dual mode ECC algorithm may be enabled.

The manner in which an exemplary "4+1" RAID architecture functions will now be explained with reference to FIG. 2. During a memory read operation, a quad-word from each of the first four memory segments 24A–24D and parity bits from the one remaining memory segment 24E are transmitted to the respective memory controllers 20A–20E. When X4 memory devices are implemented in the memory system 26 and the system is operating in X4 memory mode, each of the memory controllers 20A–20E uses the dual-mode ECC algorithm to detect and correct single bit memory errors and detect multi-bit errors. Each memory controller 20A–20E includes an ECC module 38A–38E to implement the dual mode ECC algorithm and the SEC algorithm.

When operating in X8 memory mode (i.e. the memory system 26 comprises X8 memory devices), each of the memory controllers 20A–20E uses the dual-mode ECC algorithm in the ECC modules 38A–38E to detect single bit errors, but such errors are not corrected by the ECC modules 38A–38E in the memory controllers 20A–20E. Thus, the SEC which may be provided in typical ECC schemes is disabled. If an error is detected in the memory controller 20A–20E, it may be logged in the memory controller as a single bit error (SBE) or multi-bit error (MBE). The logged information may be retained for trouble shooting and error tracking purposes, for example. Further, an error flag may be set in the data packet to mark the quad-word as including an error. Different flag bits may be set to identify the error as a SBE or a MBE if it is desirable to retain a separate tracking of each type of error. Regardless of the error type, the error is not corrected by the ECC module 38A–38E in the memory controller 20A–20E.

Once the memory controllers 20A–20E have processed the data as discussed above, the data is transferred via the respective buses 22A–22E to the host/data controller 16,18. The host/data controller 16,18 also includes ECC modules 40A–40E implementing the dual-mode ECC algorithm to detect errors in each of the four quad-words and the parity information delivered from the respective memory controllers 20A–20E. Once again, if the system is operating in X4 mode, the ECC module 40A–40E detects SBEs and MBEs. If an SBE is detected, it can be corrected by the SEC algorithm in the ECC module 40A–40E. If a MBE is detected, the error is flagged such that it may be corrected by the RAID mechanism discussed below. If the system is operating in an X8 mode, the SEC is disabled and any errors detected by the ECC modules 40A–40E are flagged but not corrected by the ECC module 40A–40E.

Each ECC module 40A–40E is coupled to a respective multiplexor 44A–44E, via an error flag path 42A–42E. If an error is detected by one of the ECC modules 40A–40E, a signal is sent to the multiplexor 44A–44E. Based on whether an error flag is sent via the error flag path 42A–42E, each respective multiplexer 44A–44E selects between the original data delivered to the multiplexors 44A–44E on respective buses 46A–46E and the re-created data generated by the exclusive OR (XOR) engine 48 delivered to the multiplexers 44A–44E via the respective buses 50A–50E. Specifically, if one of the ECC modules 40A–40E detects an error, the ECC module 40A–40E switches its respective multiplexer 44A–44E such that the bad data on the respective bus 46A–46E is replaced by the good re-created data available on the respective bus 50A–50E. It should be noted that the ECC module 40A–40E actually corrects single bit errors and transmits the corrected data via the data bus 46A–46E. However, if the system is operating in an X8 memory mode and the SEC correction in the ECC module 40A–40E is disabled or, more accurately, "discarded," the multiplexor 44A–44E is toggled such that the data on the data bus 46A–46E is ignored. Thus, in one embodiment of the present system, the SEC in the ECC modules 40A–40E is not actually disabled when the system is operating in X8 mode. Instead, the multiplexors 44A–44E are used to effectively disable the SEC by simply selecting the data delivered from the XOR engine 48 on buses 50A–50E (and discarding the data delivered on the buses 46A–46E), even if any error (including a SBE) is detected.

The data controller 18 also includes parity compare logic 54A–54E. Data is delivered to the parity compare logic 54A–54E from the ECC module 40A–40E via bus 46A–46E and the XOR engine via bus 50A–50E. The parity compare logic 54A–54E is used to protect against parity miscompares, i.e., a non-match between the data from the ECC module 40A–40E and the data from the XOR engine 48. When the system is operating in a X4 mode, SEC is enabled. Thus, if a SBE is detected by the ECC module 40A–40E, it will be corrected by the ECC module 40A–40E. If the data is properly corrected, the data from the bus 46A–46E should match the data on respective bus 50A–50E. If a parity mismatch occurs at the parity compare logic 54A–54E, an NMI may be initiated via a respective line 56A–56E. When operating in X8 mode, the parity compare logic 54A–54E is used as a fail safe to ensure that errors are not missed by always comparing the data from the ECC modules 40A to the corresponding data from the XOR engine 48. If data miscompares are detected, a non-maskable interrupt (NMI) may be initiated, as further discussed below.

An introduction to an exemplary embodiment of the functionality of the data striping and correction techniques as implemented during a read operation are briefly described with reference to FIGS. 3 and 4. In general, RAID memory provides 4+1 memory data redundancy by splitting or "striping" a single cacheline of data across four data segments, plus a fifth parity segment. This configuration provides redundancy such that any data segment can be recreated from the other four data segments if an error is detected. The data may be recreated using the XOR engine 48. As previously described, the XOR engine 48 relies on the ECC modules 38A–38E and 40A–40E to detect errors, and the XOR engine 48 may be implemented to correct those errors.

Figure 3:
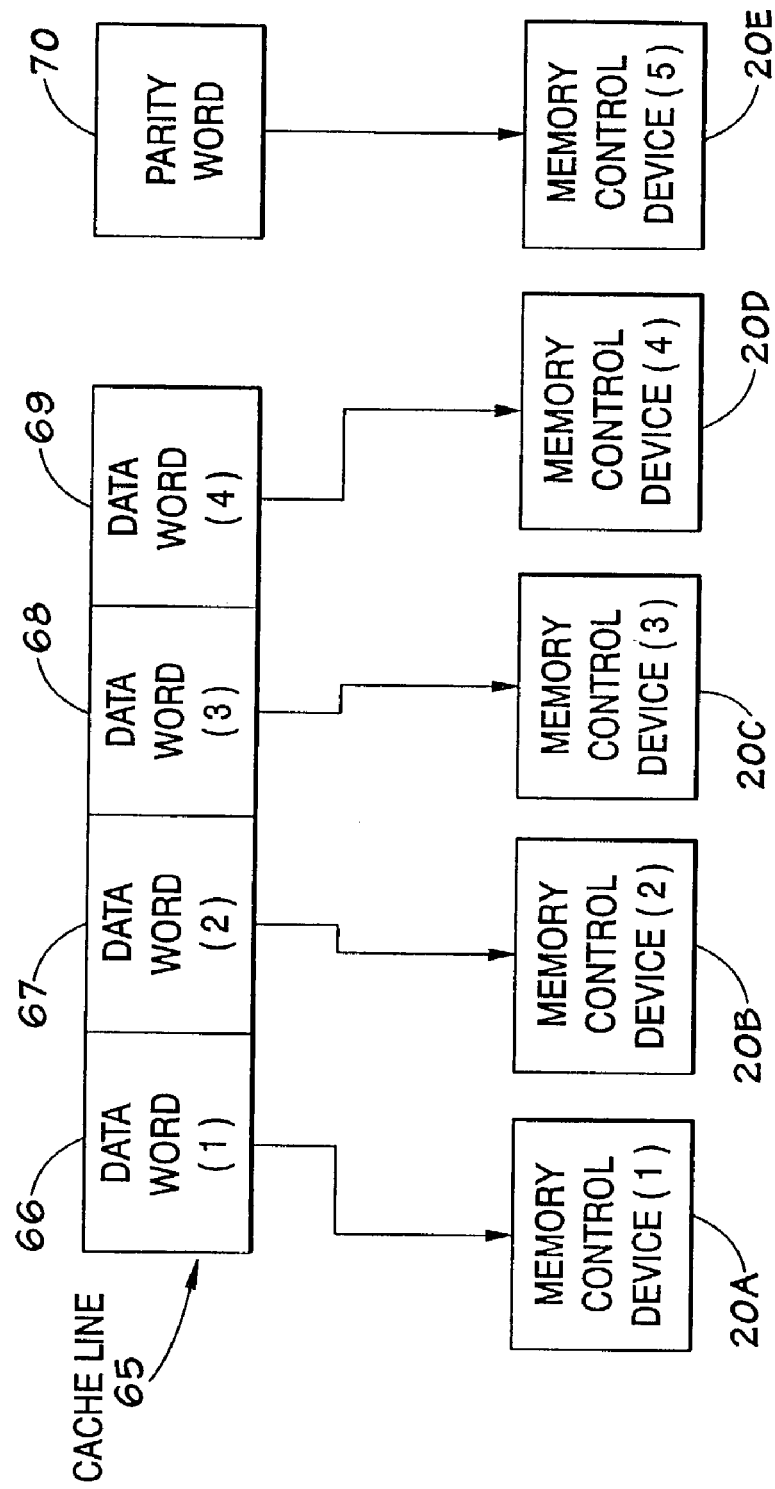
FIG. 3 is a block diagram illustrating a data striping technique in accordance with the present invention.

Turning now to FIG. 3, during a read operation, RAID memory stripes a cache line of data 65 such that each of the four 72-bit data words 66, 67, 68, and 69 is transmitted through a separate memory controller (or "memory control device") 20A–20D. A fifth parity data word 70 is generated from the original data line. Each parity word 70 is also transmitted through a separate memory controller 20E. The generation of the parity data word 70 from the original cache line 65 of data words 66, 67, 68, and 69 can be illustrated by way of example. For simplicity, four-bit data words are illustrated. However, it should be understood that these principals are applicable to 72-bit data words, as in the present system, or any other useful word lengths. Consider the following four data words:

DATA WORD 1: 1 0 1 1
DATA WORD 2: 0 0 1 0
DATA WORD 3: 1 0 0 1
DATA WORD 4: 0 1 1 1

A parity word can be either even or odd. To create an even parity word, common bits are simply added together. If the sum of the common bits is odd, a "1" is placed in the common bit location of the parity word. Conversely, if the sum of the bits is even, a zero is placed in the common bit location of the parity word. In the present example, the bits may be summed as follows:

DATA WORD 1: 1 0 1 1
DATA WORD 2: 0 0 1 0
DATA WORD 3: 1 0 0 1
DATA WORD 4: 0 1 1 1
NUMBER OF 1's: 2 1 3 3
PARITY WORD: 0 1 1 1

When summed with the four exemplary data words, the parity word 0111 will provide an even number of active bits (or "1's") in every common bit. This parity word can be used to re-create any of the data words (1–4) if an error is detected in one of the data words as further explained with reference to FIG. 4.

Figure 4:
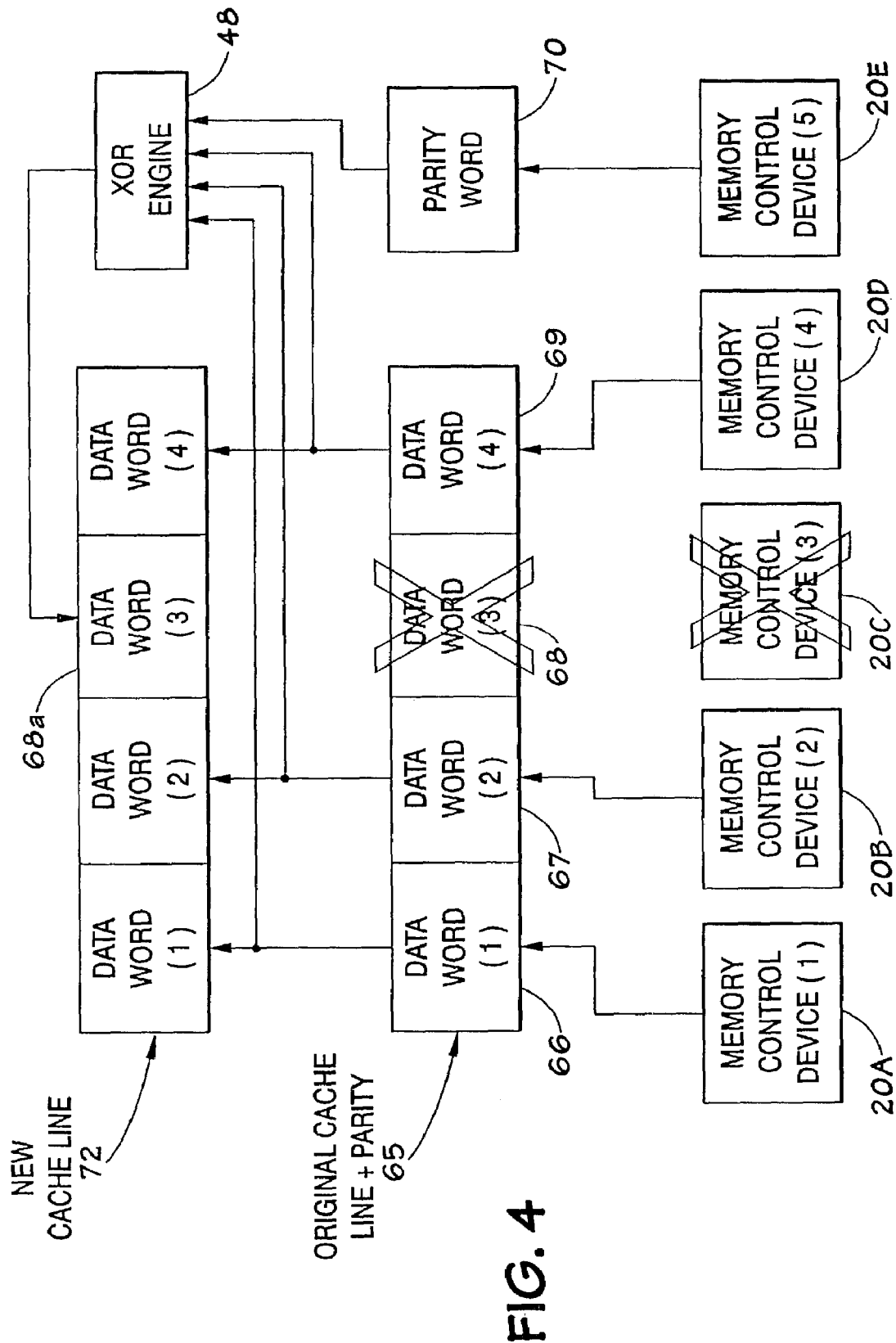
FIG. 4 is a block diagram illustrating a data correction technique in accordance with the present invention.

FIG. 4 illustrates the re-creation of a data word in which an error has been detected in one of the ECC modules 38A–38E or 40A–40E implemented during a read operation. As in FIG. 3, the original cache line 65 comprises four data words 66, 67, 68, and 69 and a parity word 70. Further, the memory control devices 20A–20E corresponding to each data word and parity word are illustrated. In this example, a data error has been detected in the data word 68. A new cache line 72 can be created using data words 66, 67, and 69 along with the parity word 70 using the XOR engine 48. By combining each data word 66, 67, 69 and the parity word 70 in the XOR engine 48, the data word 68 can be re-created. The new and correct cache line 72 thus comprises data words 66, 67, and 69 copied directly from the original cache line 65 and data word 68a (which is the re-created data word 68) which is produced by the XOR engine 48 using the error-free data words (66, 67, 69) and the parity word 70. It should also be clear that the same process may be used to re-create a parity word 70 if an error is detected therein.

Similarly, if the memory controller 20A–20E, which is associated with the data word 68, is removed during operation (i.e. hot-plugging) the data word 68 can similarly be re-created. Thus, any single memory controller can be removed while the system is running or any single memory controller can return a bad data word and the data can be re-created from the other four memory control devices using the XOR engine 48.

Similarly, the XOR engine 48 is used to generate parity data during a write operation. As a cache line of data is received by the host/ data controller 16, 18, the cache line is striped such that the data may be stored across four of the segments 24A–24D. In one embodiment, the cache line is divided to form four 72-bit data words. As described with reference to FIGS. 3 and 4 and the read operation, the XOR engine 48 may be implemented to generate a parity data word from each or the four data words. The parity data word may then be stored in the memory segment 24E to provide parity data for use in the read operations. It should also be noted that the ECC modules 40A–40E and 38A–38E may also be implemented during the write operation to detect and correct single bit errors in the data words and/or parity word.

Returning to FIG. 2, when operating in X4 memory mode, the XOR engine 48 may be used to correct multi-bit errors only in addition to the error correction in the ECC module 38A–38E in each memory controller 20A–20E, as described above. Conversely, when operating in X8 memory mode, the XOR engine 48 corrects both single bit errors and multi-bit errors. That is to say that the SEC algorithm is disabled (i.e., the data corrected by the SEC algorithm in the ECC module 40A–40E is ignored) when operating in X8 mode. When operating in X4 memory mode, each memory segment 24A–24E may exhibit a single bit error which may be corrected by the ECC module 40A–40E without even triggering the use of the re-created data generated by the XOR engine 48. However, if a multi-bit error is detected, only a single memory error (single or multi-bit) on one of the memory segments 24A–24E can be corrected per each memory transaction using the XOR engine 48. When operating in X8 memory mode, the host/data controller 16,18 can correct only one single bit error or multi-bit error in one of the memory segments 24A–24E. Thus, if more than one of the memory segments 24A–24E exhibits a single bit error or a multi-bit error in X8 memory mode, or if more than one of the memory segments 24A–24E exhibits a multi-bit error in X4 memory mode, the XOR engine 48 will be unable to create good data to be transmitted out of the host/data controller 16,18 on the buses 52A–52E. To track this condition (i.e. simultaneous errors on multiple memory segments 24A–24E), the XOR engine 48 may be notified via an error detection signal each time an error is detected, as further described below.

As described above, one side-effect of changing to the presently described approach to error correction is that a class of error that previously was corrected by the ECC SEC logic, becomes an uncorrectable error condition. Recall that when the system is operating in X4 memory mode, the dual-mode ECC module 38A–38E and/or 40A–40E is able to detect and correct single-bit errors. Thus, if multiple ECC modules 38A–38E or 40A–40E detect single-bit errors on the same transaction ("SBE-SBE condition"), each of these errors will be detected and corrected by the SEC code in the corresponding ECC modules 38A–38E or 40A–40E and the transaction will complete without necessitating a system interrupt or other-wise degrading system performance.

Conversely, in X8 memory mode, single-bit error correction by ECC is turned off. By turning off single-bit error correction, the above-mentioned misaliasing problem with X8 devices is eliminated and the dual-mode ECC algorithm provides X8 chipkill detection. In this mode of operation, all errors, including single-bit errors, are corrected by the XOR engine 48. The drawback to this solution is that the previously harmless SBE-SBE condition described above will now overwhelm the XOR engine 48, forcing it to produce a NMI. That is, if two ECC modules 38A–38E or 40A–40E experience a SBE on the same transaction, where previously they would have both corrected the data, will both pass uncorrected data. Since the XOR engine 48 can only fix one error per transaction, an uncorrectable error has occurred and a NMI is produced. An NMI is generated whenever an event occurs of which the operating system should be notified. After an NMI event is handled by the operating system, the system is usually reset and/or rebooted.

When operating in X8 mode, one solution to the SBE-SBE condition is a trade-off. If one single-bit error occurs, the XOR engine 48 corrects the error, but if more than one single-bit error occurs on a single transaction, then correct one or all of the single-bit errors using the ECC module 40A–40E rather than the XOR engine 48. The assumption is that if an SBE-SBE condition occurs, it is far more likely that the error is, in fact, due to multiple independent single-bit errors and not an X8 chipkill error misaligning with a single-bit error. Furthermore, even if it is an X8 chipkill, the error will result in a parity miscompare at the comparator circuits 54A–54E and the system will produce a NMI.

To implement this solution in X8 mode, an XOR mux controller 58 in the XOR engine 48 may be implemented. If an error is detected in an ECC module 40A–40E, an error flag is sent to the XOR mux controller 58 via an error flag path 60A–60E. The error flag indicates that an error has been detected for a particular data word and further indicates whether the error is a single-bit error or a multi-bit error. The XOR mux controller 58 performs a comparison of each data word and the parity word for each transaction. Thus, the XOR mux controller 58 determines if an error is detected in more than one ECC module 40A–40E in a single transaction. If two errors are detected, the XOR mux controller 58 toggles one or both of the respective multiplexors 44A–44E via the error flag path 62A–62E such that the data corrected by the ECC module 40A–40E can be transmitted. Recall that if an error is detected in the ECC module 40A–40E, the respective multiplexor 44A–44E is toggled such that the data word is transmitted from the XOR corrected data bus 50A–50E. If two errors are detected on the same transaction, one or both of the respective multiplexors 40A–40E is toggled back by the XOR mux controller 58 such that the data is transmitted from the data bus 46A–46E carrying the data corrected by the ECC module 40A–40E. If both of the errors are SBEs, the XOR mux controller 58 may be configured to re-toggle either one or both of the respective multiplexors 44A–44E. If one of the errors is a SBE and the other error is a MBE, the XOR mux controller 58 toggles only the multiplexor 44A–44E corresponding to the SBE data path. That is to say that the SBE is corrected by the corresponding ECC module 40A–40E while the MBE is corrected by the XOR engine 48. If both errors are MBEs, an NMI may be initiated as described above.

Figure 5:
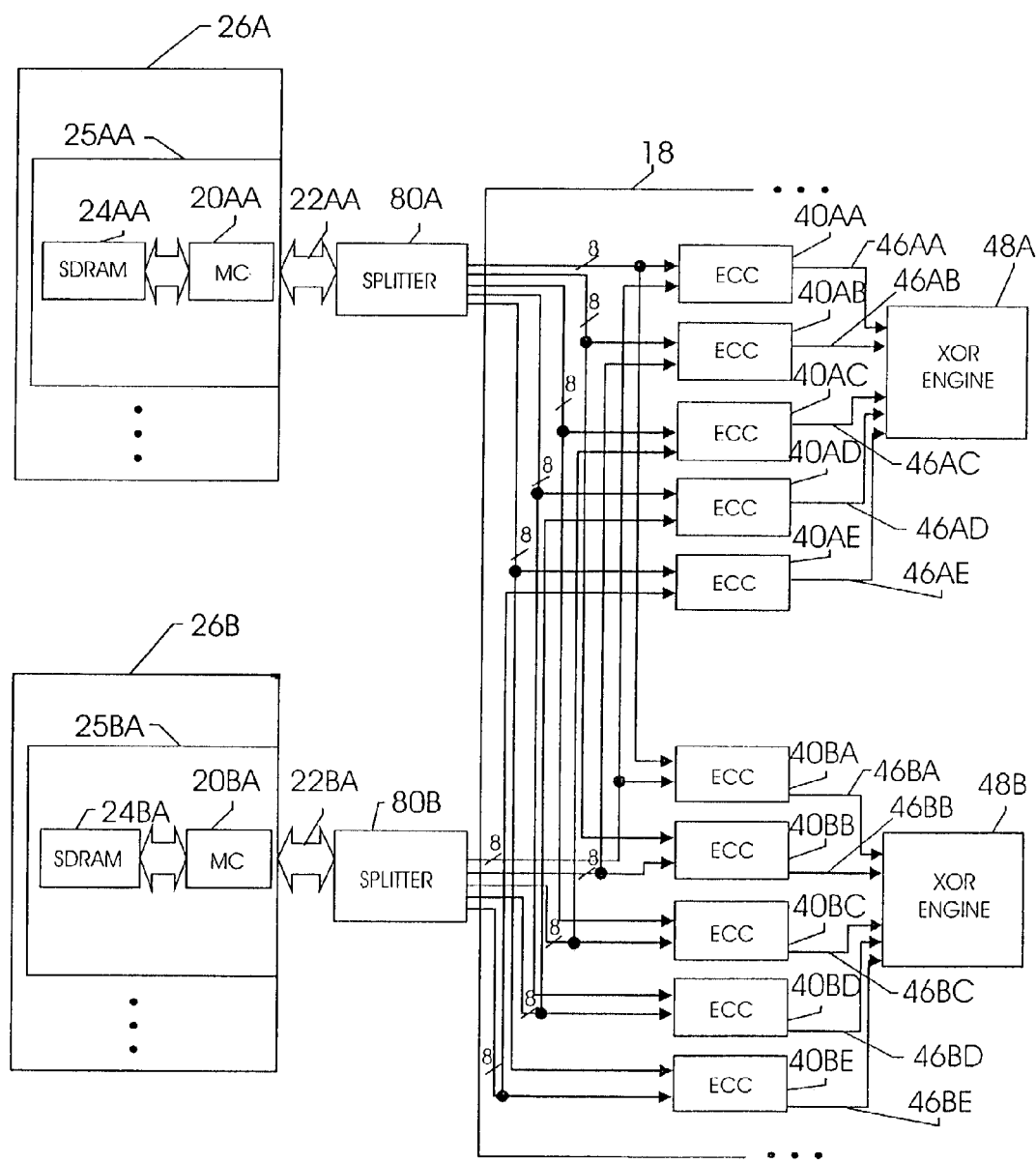
FIG. 5 is a block diagram illustrating an alternate technique for detecting memory errors in accordance with the present invention.

The present techniques can also be implemented for X16 and X32 devices, as well. One implementation incorporating X16 devices is illustrated with reference to FIG. 5. Generally speaking, for a system implementing X16 devices and having X16 chipkill, the memory array 26 (FIG. 1) comprises two memory subsystems 26A and 26B, as illustrated in FIG. 5. For simplicity, for each memory subsystem 26A and 26B, a single memory cartridge 25AA and 25BA, respectively, are illustrated. However, as can be appreciated, the memory subsystem 26A may include five memory cartridges 25AA–25AE, and the memory subsystem 26B may include five memory cartridges 25BA–25BE. Each of the memory cartridges 25 includes respective memory segments 24 and respective memory controllers 20, as previously described. In the present exemplary embodiment, a memory cartridge 25AA having a memory segment 24AA and memory controller 20AA is illustrated in the memory subsystem 26A. Similarly, a memory cartridge 25BA having a memory segment 24BA and memory controller 20BA is illustrated in the memory subsystem 26B. In the present exemplary embodiment, each of the memory devices in the memory segments 24AA–24AE and 24BA–24BE comprises a X16 SDRAM device.

Figure 2:
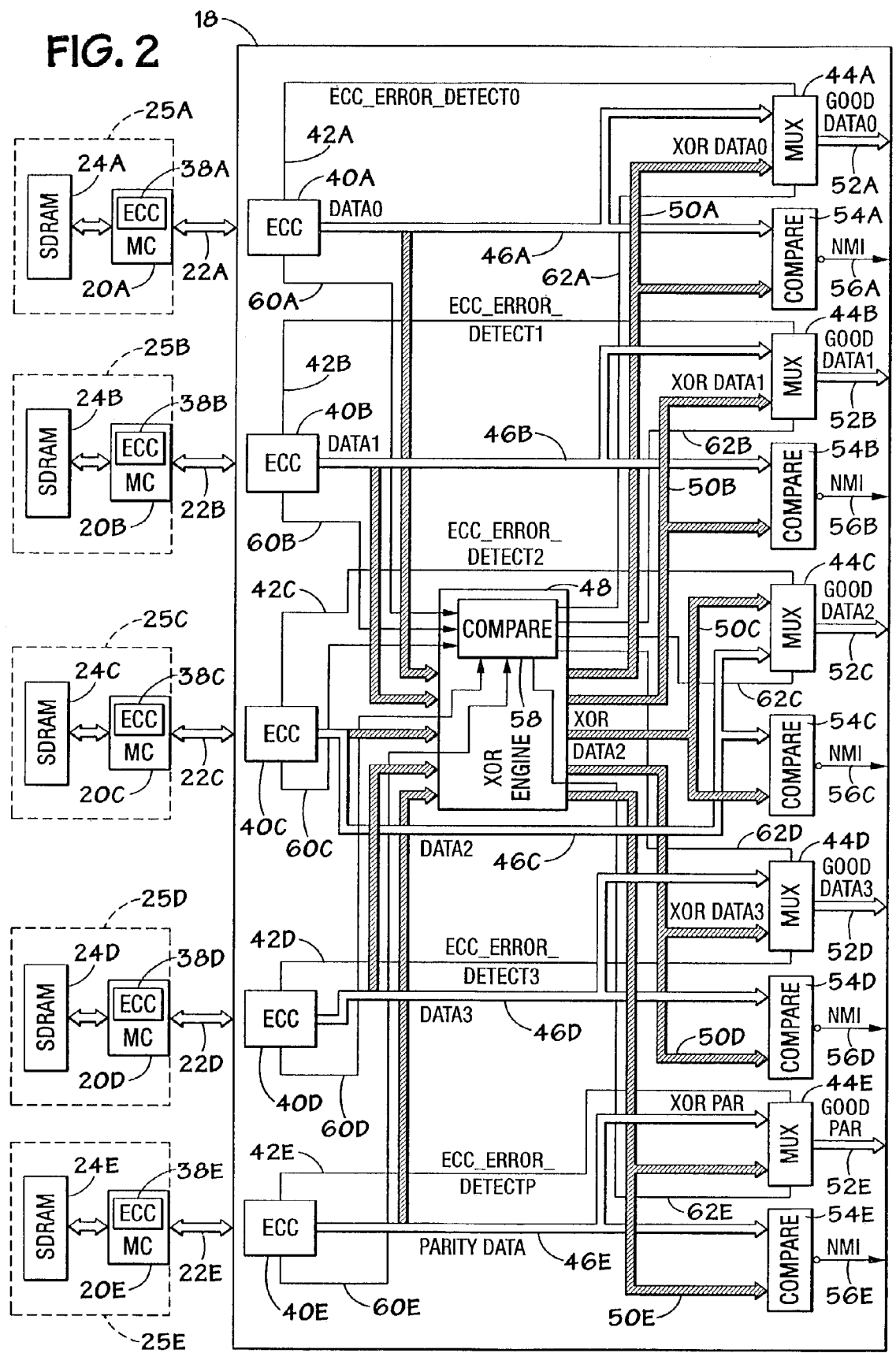
FIG. 2 is a block diagram illustrating an exemplary error detection and correction system in accordance with the present invention.

Referring briefly to FIG. 2, when the system includes X4 or X8 memory devices, each ECC module 40A–40E is configured to receive data from or pass data to a respective one of the memory segments 24A–24E. As previously described, each ECC module 40A–40E implementing the dual mode ECC algorithm is able to detect errors in up to 8 adjacent bits.

To facilitate X16 chipkill, the data controller 18 comprise two sets of ECC modules 40AA–40AE and 40BA–40BE and two XOR engines 48A and 48B, as illustrated in FIG. 5. Generally speaking, during a read operation, the first 16 bits from the same SDRAM device may be split evenly between ECC modules. As previously described, each ECC module 40AA–40AE and 40BA–40BE is capable of detecting memory errors within the same byte (i.e. 8 adjacent bits). Accordingly, two ECC modules operating in tandem can detect any error within the same 16-bit memory device. Data correction will be handled by the respective XOR engines 48A and 48B.

To facilitate the division of bits from each X16 device in the memory segments 24AA–24AE, a splitter 80A is provided. The splitter 80A is configured to split the data bits evenly between two corresponding ECC units. For instance, during a first read operation, a 16-bit data word is sent from the SDRAM device in the memory segment 24AA, through the memory controller 20AA and to the splitter 80A. The 16-bit data word is divided into two 8-bit data words. The first 8-bit data word may be delivered to the ECC module 40AA, and the second 8-bit data word may be delivered to the ECC module 40BA. Each of the ECC modules 40AA and 40BA is configured to detect errors in up to 8 bits of data.

Similarly, to facilitate the division of bits from each X16 device in the memory segments 24BA–24BE, a splitter 80B is provided. The splitter 80B is configured to split the data bits evenly between two corresponding ECC units. For instance, during a first read operation, a 16-bit data word is sent from the SDRAM device in the memory segment 24BA, through the memory controller 20BA and to the splitter 80B. The 16-bit data word is divided into two 8-bit data words. The first 8-bit data word may be delivered to the ECC module 40AA, and the second 8-bit data word may be delivered to the ECC module 40BA. Each of the ECC modules 40AA and 40BA is configured to detect errors in up to 8 bits of data.

As can be appreciated, the dual sets of ECC modules 40AA–40AE and 40BA–40BE may be implemented in tandem to detect any errors in the X16 memory devices. Further, and as described above with reference to the X8 chipkill, each of the XOR engines 48A and 48B may be implemented to provide error correction in any of the 8-bit data words. By implementing two XOR engines 48A and 48B, along with the corresponding ECC modules 40AA–40AE and 40BA–40BE, any errors detected in the 8-bit data words may be corrected. Accordingly, the system of FIG. 5 illustrates a technique for providing X16 chipkill.

Similarly, X32 chipkill may be provided by implementing a third and fourth memory subsystem 26C and 26D (not illustrated), along with an additional splitter, an additional set of ECC modules in the data controller 18 and an additional XOR engine for each corresponding memory subsystem 26C and 26D. The splitter for a X32 chipkill system would be configured to split a 32-bit word into four 8-bit data words. As can be appreciated, each set of ECC modules and each XOR engine would be capable of detecting/correcting errors in up to 8 adjacent bits. Accordingly, operating in tandem, the presently described system provides for X32 chipkill, as can be appreciated by those skilled in the art.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system comprising:
a plurality of memory cartridges, wherein each of the memory cartridges comprises a plurality of N-bit wide memory devices;
a plurality of first error-handling modules each comprising a first and second mode of operation, wherein each of the plurality of first error-handling modules is configured to detect data errors in each of the N-bit wide memory devices when the first error-handling module is in the first mode of operation and configured to detect multi-bit data errors in two adjacent nibbles in a 2*N-bit wide memory device when the first error-handling module is operating in the second mode of operation, and wherein each of the plurality of first error-handling modules produces a first output signal, wherein N is an integer equal to 4, 8, 16 or 32;
a second error-handling module electrically coupled to each of the plurality of first error-handling modules and configured to correct the data errors detected in any of the plurality of first error-handling modules, wherein the second error-handling module produces a second output signal; and
a splitting device coupled between the plurality of memory cartridges and the plurality of first error-handling modules and configured to receive a plurality of data bits from any one of the plurality of memory cartridges and distribute the plurality of data bits evenly among each of the error detection modules.

2. The system, as set forth in claim 1, comprising a plurality of switches corresponding to each of the plurality of first error-handling modules, each of the plurality of switches having a first and second state, wherein each of the plurality of switches is coupled to a respective one of the plurality of first error-handling modules and the second module, and wherein each of the plurality of switches is configured to receive each of the corresponding first output signal and the second output signal and configured to transmit only one of the first output signal and the second output signal depending on the state of the switch.

3. The system, as set forth in claim 1, wherein the each of the plurality of first error-handling modules comprises ECC code.

4. The retention system as recited in claim 1, wherein the retainer plug comprises an edge groove sized to receive a card edge of the printed circuit card.

5. The system, as set forth in claim 1, wherein the second module comprises an exclusive-or (XOR) module.

6. The system, as set forth in claim 2, wherein the respective switch is set to the first state when no errors are detected by the first corresponding error-handling module.

7. The system, as set forth in claim 2, wherein the switch is set to the second state when a data error is detected by the first corresponding error-handling module.

8. The system, as set forth in claim 7, wherein each of the plurality of first error handling modules is configured to produce a corresponding flag if an error is detected in the corresponding first-error handling module.

9. The system, as set forth in claim 8, wherein the second-error handling module comprises a compare circuit configured to receive the error flags from each of the plurality of first error-handling modules and configured to reset the corresponding switch to the first state if more than one error flag received.

10. A system comprising:
a plurality of memory cartridges each comprising a plurality of memory devices;
a plurality of error detection modules configured to detect errors in up to 8 adjacent bits of data, wherein each of the plurality of error detection modules is coupled to each of the plurality of memory cartridges; and
a splitting device coupled between the plurality of memory cartridges and the plurality of error detection modules and configured to receive a plurality of data bits from any one of the plurality of memory cartridges and distribute the plurality of data bits evenly among each of the error detection modules.

11. The system, as set forth in claim 10, wherein each of the plurality of error detection modules comprises ECC code.

12. The system, as set forth in claim 10, comprising an error correction module coupled to each of the plurality of error detection modules and configured to correct each of the single bit errors and multi bit errors detected by the plurality of the error detection modules.

13. The system, as set forth in claim 12, wherein the error correction module comprises an exclusive-or (XOR) module.

14. The system, as set forth in claim 10, wherein the plurality of memory devices comprise a plurality of X16 memory devices.

15. The system, as set forth in claim 10, wherein the plurality of memory devices comprise a plurality of X32 memory devices.

* * * * *

UNITED STATES PATENT AND TRADEMARK OFFICE
CERTIFICATE OF CORRECTION

| | | |
|---|---|---|
| PATENT NO. | : 7,096,407 B2 | Page 1 of 1 |
| APPLICATION NO. | : 10/369051 | |
| DATED | : August 22, 2006 | |
| INVENTOR(S) | : Sompong P. Olarig | |

It is certified that error appears in the above-identified patent and that said Letters Patent is hereby corrected as shown below:

In column 6, line 44, delete "PA ECC" and insert -- P^ ECC --, therefor.

In column 7, line 18, after "logical" delete "is" and insert -- 1s --, therefor.

Signed and Sealed this

Tenth Day of March, 2009

JOHN DOLL
*Acting Director of the United States Patent and Trademark Office*